United States Patent
Lim (10) Patent No.: US 10,046,866 B2
(45) Date of Patent: Aug. 14, 2018

(54) APPARATUS FOR AUTOMATICALLY MOUNTING AND DISMOUNTING AIRCRAFT FUSELAGE

(71) Applicant: KOREA AEROSPACE INDUSTRIES, LTD., Sacheon-si, Gyeongsangnam-do (KR)

(72) Inventor: Sung Min Lim, Sacheon-si (KR)

(73) Assignee: Korea Aerospace Industries, Ltd., Sacheon-si (KR)

( * ) Notice: Subject to any disclaimer, the term of this patent is extended or adjusted under 35 U.S.C. 154(b) by 42 days.

(21) Appl. No.: 14/712,653

(22) Filed: May 14, 2015

(65) Prior Publication Data

US 2016/0185467 A1 Jun. 30, 2016

(30) Foreign Application Priority Data

Dec. 30, 2014 (KR) .................. 10-2014-0192882

(51) Int. Cl.
*G01S 17/66* (2006.01)
*G01S 17/88* (2006.01)
(Continued)

(52) U.S. Cl.
CPC .............. *B64F 5/0009* (2013.01); *B64F 5/10* (2017.01); *G01S 17/66* (2013.01); *G01S 17/88* (2013.01)

(58) Field of Classification Search
CPC ...... B64F 5/0009; B64F 5/0081; G01S 17/66; G01S 17/88; G01S 17/89;
(Continued)

(56) References Cited

U.S. PATENT DOCUMENTS 4,522,548 A * 6/1985 Oswald ..................... B60P 3/00
254/8 C
4,526,344 A * 7/1985 Oswald ..................... B64F 1/32
254/122
(Continued)

FOREIGN PATENT DOCUMENTS

JP 2013124099 A 6/2013
JP 2013542878 A 11/2013
(Continued)

OTHER PUBLICATIONS

KR 20030062721; Automatic Connecting Device and Method; EPO English Machine Translation; Aug. 19, 2016; pp. 1-3.*

*Primary Examiner* — Bayan Salone
(74) *Attorney, Agent, or Firm* — McCoy Russell LLP (57) ABSTRACT

An apparatus for automatically mounting and dismounting an aircraft fuselage includes stages disposed to be spaced apart from each other, positioners disposed between the stages and on which a plurality of fuselage parts are mounted, the positioners adjusting a position of each of the mounted fuselage parts in X, Y, and Z directions, and a transfer unit allowing the fuselage parts to be automatically respectively mounted on the positioners, the transfer unit automatically dismounting the assembled fuselage from the positioners to transfer the assembled fuselage after the fuselage parts are completely assembled with each other. The apparatus may automatically mount and dismount the fuselage to reduce assembly time, thereby improving productivity of the fuselage, assembly quality and workability.

9 Claims, 10 Drawing Sheets (51) Int. Cl.
    *G01S 17/89*     (2006.01)
    *B64F 5/00*      (2017.01)
    *B64F 5/10*      (2017.01)
(58) Field of Classification Search
    CPC ......... Y10T 29/49762; Y10T 29/49764; Y10T 29/49769; Y10T 29/49778; Y10T 29/4978; Y10T 29/53061; Y10T 29/53961; Y10T 29/53974; Y10T 29/53087
    USPC ............ 29/281.1, 281.4, 714, 407.1, 407.04, 29/407.09
    See application file for complete search history.

(56) References Cited

U.S. PATENT DOCUMENTS

| | | | | |
|---|---|---|---|---|
| 5,346,313 A * | 9/1994 | Ng | ........................ | F16C 29/069 384/43 |
| 6,948,401 B2 * | 9/2005 | Zernickel | ............... | B62D 1/185 384/49 |
| 7,305,277 B2 * | 12/2007 | Freeman | ................. | G01S 5/163 700/114 |
| 7,624,488 B2 * | 12/2009 | Lum | ........................ | B25B 5/14 269/287 |
| 8,272,118 B2 * | 9/2012 | Alvez | ...................... | B21J 15/14 29/464 |
| 8,602,713 B1 * | 12/2013 | Davis | ..................... | B60P 1/025 254/10 C |
| 8,606,388 B2 * | 12/2013 | Cobb | .................... | B64F 5/0009 29/407.09 |
| 8,620,470 B2 * | 12/2013 | Cobb | .................... | B64F 5/0009 29/407.1 |
| 8,731,781 B2 * | 5/2014 | Prentice | ................. | B62D 35/02 296/180.1 |
| 8,733,707 B2 * | 5/2014 | Stone | ...................... | B23P 19/10 244/175 |
| 9,217,466 B2 * | 12/2015 | Ng | ....................... | F16C 29/0685 |
| 2009/0039198 A1 * | 2/2009 | Buckus | ................. | B64F 5/0009 244/99.3 |
| 2010/0192376 A1 * | 8/2010 | Frauen | .................. | B64F 5/0009 29/897.2 |
| 2010/0263190 A1 * | 10/2010 | Buckus | ................. | B64F 5/0009 29/428 |
| 2013/0152397 A1 * | 6/2013 | Oberoi | .................. | B64F 5/0009 29/897.2 |
| 2015/0367930 A1 * | 12/2015 | Attucci | ................... | B23P 19/10 29/897.2 |

FOREIGN PATENT DOCUMENTS

KR     100453625 B1     7/2003
KR     20030062721 A  *  7/2003
WO     2013117971 A1    8/2013

* cited by examiner

APPARATUS FOR AUTOMATICALLY MOUNTING AND DISMOUNTING AIRCRAFT FUSELAGE

CROSS-REFERENCE TO RELATED APPLICATIONS

This application claims the priority of Korean Patent Application No. 10-2014-0192882 filed on Dec. 30, 2014 in the Korean Intellectual Property Office, the disclosure of which is incorporated herein by reference.

BACKGROUND OF THE INVENTION

Field of the Invention

The present invention relates to an apparatus for automatically mounting and dismounting an aircraft fuselage, and more particularly, to an apparatus for automatically mounting and dismounting an aircraft fuselage, which is capable of automatically mounting and dismounting the fuselage to reduce an assembly time, thereby improving productivity, assembly quality, and workability of the aircraft fuselage.

Description of the Related Art

According to the related art, when a fuselage is assembled, forward, center, and after fuselages are separately transferred by a crane and then manually assembled with each other by using a fuselage fixing jig tool by a worker. Thus, it takes a lot of time to assemble the fuselages with each other, and there are many limitations in productivity and safety due to its low assembly accuracy.

That is, each of the fuselages is transferred and mounted on the fuselage fixing jig tool at a predetermined height and position. Then, the worker manually adjusts the height and position of each of the fuselages in X, Y, and Z directions to assemble the fuselages with each other. Thus, the fuselages have poor assembly accuracy and workability and involve high risk of safety accidents.

Therefore, there are needs for developing a device for automatically mounting and dismounting the fuselage in assembling of the fuselage to improve assembly accuracy, workability, and productivity and reduce assembly time, and prevent safety accidents.

PRIOR ART DOCUMENT

Patent Document: Korean Patent No. KR 10-0453625 (Oct. 11, 2014)

SUMMARY OF THE INVENTION

An aspect of the present invention provides an apparatus for automatically mounting and dismounting an aircraft fuselage, which is capable of automatically mounting and dismounting the fuselage to reduce assembly time, thereby improving productivity of the fuselage, assembly quality, and workability.

According to an aspect of the present invention, there is provided an apparatus for automatically mounting and dismounting an aircraft fuselage, the apparatus including: stages disposed to be spaced apart from each other; positioners disposed between the stages and on which a plurality of fuselage parts are mounted, the positioners adjusting a position of each of the mounted fuselage parts in X, Y, and Z directions; and a transfer unit allowing the fuselage parts to be automatically respectively mounted on the positioners, the transfer unit automatically dismounting the assembled fuselage from the positioners to transfer the assembled fuselage after the fuselage parts are completely assembled with each other.

Also, the positioners may include: forward fuselage positioners on which a forward fuselage of the plurality of fuselage parts is mounted, the forward fuselage positioners being disposed in a triangular shape to support three spots of a lower portion of the forward fuselage and being fixed to the ground; center fuselage positioners on which a center fuselage of the plurality of fuselage parts is mounted, the center fuselage positioners being disposed in a rectangular shape to support four spots of a lower portion of the center fuselage and being fixed to the ground; and after fuselage positioners on which a after fuselage of the plurality of fuselage parts is mounted, the after fuselage positioners being disposed in the rectangular shape to support four spots of a lower portion of the after fuselage and being fixed to the ground.

Also, an adaptor having a ball shape may be disposed on an upper end of each of the positioners, and a connector bracket having a seating unit with a cup shape into which the adaptor having the ball shape is inserted may be coupled to each of the fuselage parts.

Also, the forward fuselage positioners may include: a first-1 positioner that is three-axially driven in the X, Y, and Z directions; a first-2 positioner that is movable in the X direction, the first-2 positioner being two-axially driven in the Y and Z directions; and a first-3 positioner that is movable in the X and Y directions, the first-3 positioner being one-axially driven in the Z direction.

Also, the center fuselage positioners may include: a second-1 positioner fixed in the X and Y directions, the second-1 positioner being one-axially driven in the Z direction; a second-2 positioner fixed in the X direction and movable in the Y direction, the second-2 positioner being one-axially driven in the Z direction; and second-3 and second-4 positioners each of is fixed in the X and Y directions, the second-3 and second-4 positioners rotating about an axis in the Z direction and being one-axially driven in the Z direction.

Also, the adaptor having the ball shape may be disposed on an upper end of the second-2 positioner, and a linear motion (LM) bearing may be disposed between the adaptor and the upper end.

Also, the adaptor having the ball shape may be disposed on an upper end of each of the second-3 and second-4 positioners, and a thrust bearing may be disposed between the adaptor and the upper end.

Also, the after fuselage positioners may include: a third-1 positioner three-axially driven in the X, Y, and Z directions; a third-2 positioner that is movable in the X direction, the third-2 positioner being two-axially driven in the Y and Z directions; a third-3 positioner that is movable in the X and Y directions, the third-3 positioner being one-axially driven in the Z direction; and a third-4 positioner that is movable in the X and Y directions, the third-4 positioner being one-axially driven in the Z direction.

Also, the transfer unit may include an automated guided vehicle (AGV), and the AGV may be provided in two or more.

The transfer unit may be adjusted in vertical height so that each of the fuselage parts and the assembled fuselage is adjusted in vertical height.

The apparatus may further include: a laser tracker irradiating laser beams onto a plurality of points on each of the fuselage parts when the fuselage parts are mounted on the positioners to detect the position of each of the fuselage parts, thereby transmitting a detected position detection signal; and a control unit receiving the position detection signal transmitted from the laser tracker to calculate a difference between data with respect to the position detection signal and preset data, thereby generating and transmitting micro-driving data of the positioner until a difference between the positions of the fuselage parts do not exist.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, an apparatus for automatically mounting and dismounting an aircraft fuselage according to the present invention will be described in detain with reference to accompanying drawings.

Figure 1:
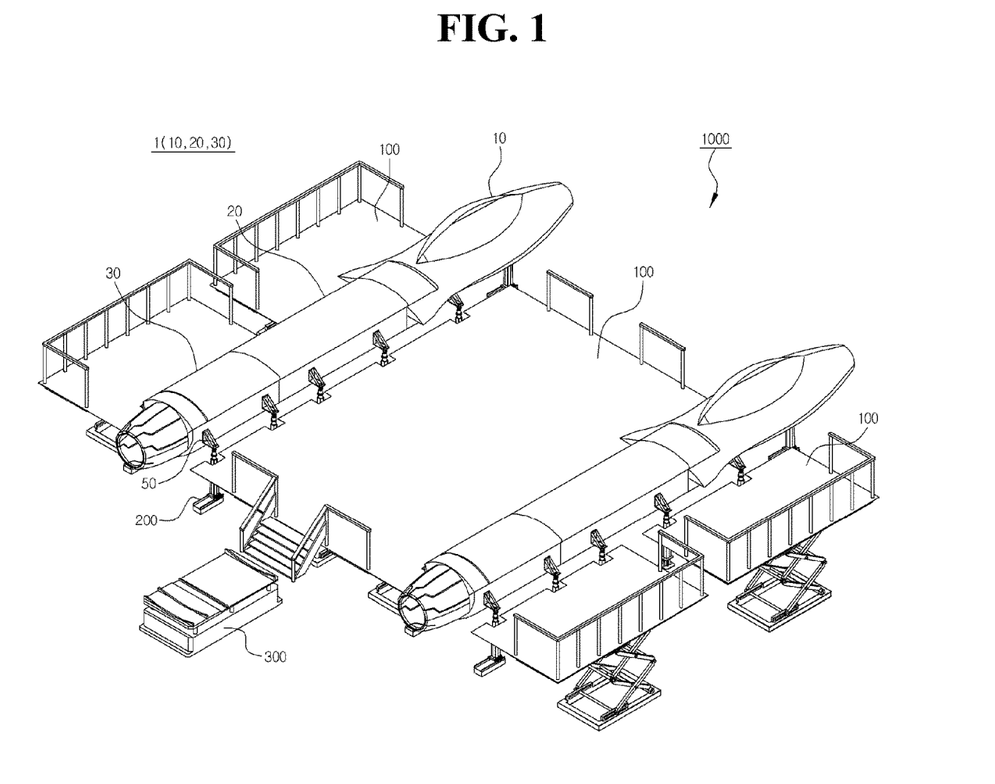
FIG. 1 is a perspective view of an apparatus for automatically mounting and dismounting an aircraft fuselage according to present invention.
Figure 2:
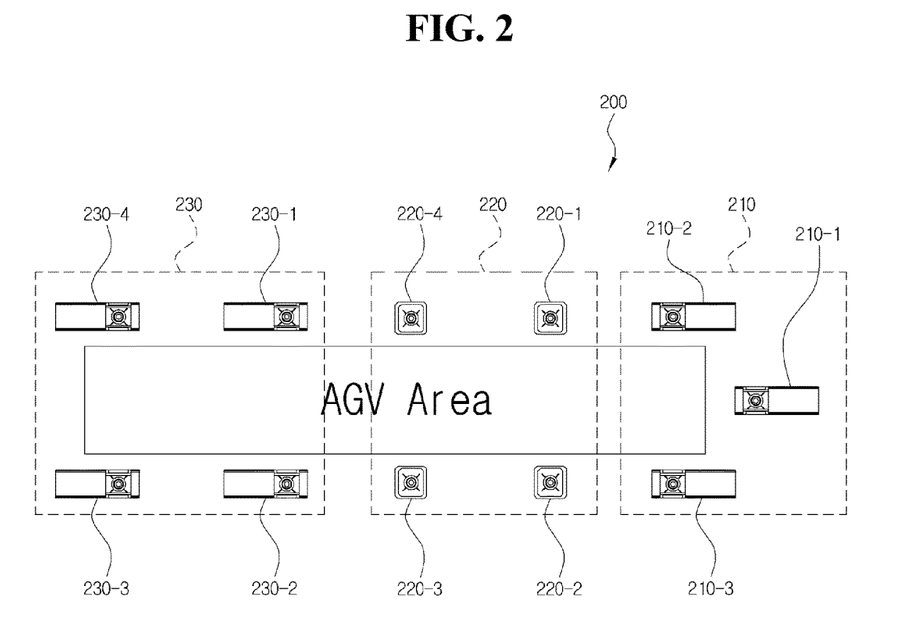
FIGS. 2 and 3 are an upper plan view and a front view illustrating positioners according to the present invention.
Figure 3:
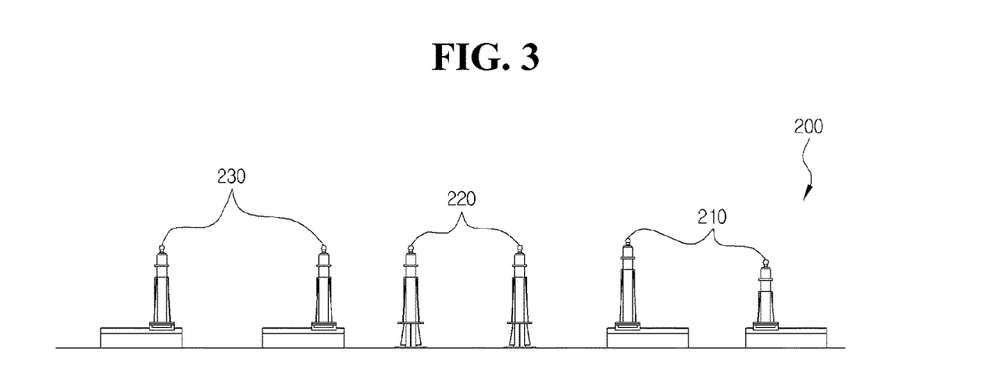
Figure 4:
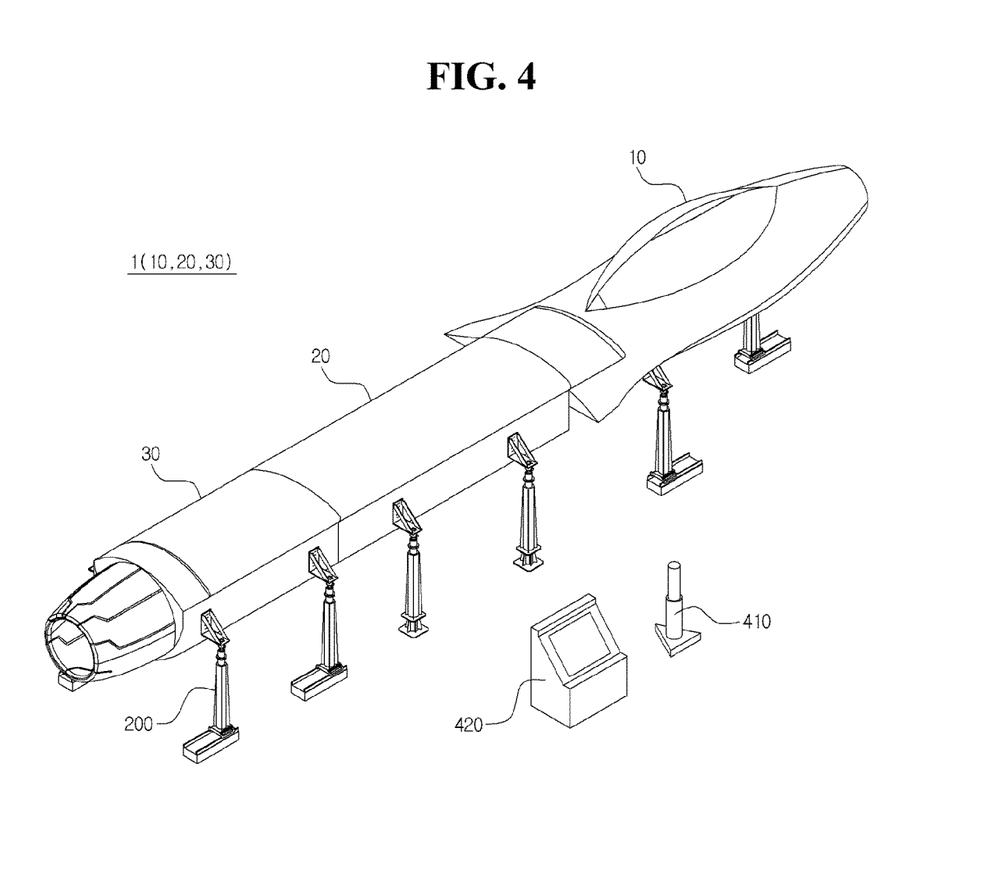
FIG. 4 is a perspective view illustrating a state in which fuselage parts are mounted on the positioners according to the present invention.

FIG. 1 is a perspective view of an apparatus for automatically mounting and dismounting an aircraft fuselage according to present invention, FIGS. 2 and 3 are an upper plan view and a front view illustrating positioners according to the present invention, and FIG. 4 is a perspective view illustrating a state in which fuselage parts are mounted on the positioners according to the present invention.

As illustrated, the apparatus 1000 for automatically mounting and dismounting the aircraft fuselage according to an embodiment of the present invention includes: stages 100 disposed to be spaced apart from each other; positioners 200 disposed between the stages and on which a plurality of fuselage parts 10, 20, and 30 are mounted, the positioners 200 adjusting a position of each of the mounted fuselage parts 10, 20, and 30 in X, Y, and Z directions; and a transfer unit 300 allowing the fuselage parts 10, 20, and 30 to be automatically respectively mounted on the positioners 200, the transfer unit 300 automatically dismounting the assembled fuselage 1 from the positioners 200 to transfer the assembled fuselage 1 after the fuselage parts 10, 20, and 30 are completely assembled with each other.

First, each of the stages 100 is a workbench on which workers climb up to check and assemble the fuselage parts 10, 20, and 30. The stage 100 may be provided in a pair, and the pair of stages 100 may be disposed to be spaced apart from each other. Also, a hydraulic lift may be coupled to the stage 100 to adjust a height of a top plate of the stage 100. Here, the stage 100 may be provided in three, and the three stages 100 may be disposed to be spaced apart from each other. Also, three or more stages 100 may be parallelly disposed.

The positioners 200 are disposed between the stages 100 spaced apart from each other. The positioners 200 may have lower sides fixed to the ground and upper sides on which the plurality of fuselage parts 10, 20, and 30 are respectively mounted. Here, each of the positioners 200 may adjust a position of each of the fuselage parts 10, 20, and 30 in X, Y, and Z directions. Each of the fuselage parts 10, 20, and 30 may be fixed in position after each of the fuselage parts 10, 20, and 30 is adjusted in position in a state where each of the fuselage parts 10, 20, and 30 is seated and mounted on the upper side of each of the positioners 200.

The transfer unit 300 may load the fuselage parts 10, 20, and 30 thereon at a predetermined place to transfer the fuselage parts 10, 20, and 30. Then, the transfer unit 300 may allow each of the fuselage parts 10, 20, and 30 to be seated, thereby automatically each of mounting the fuselage parts 10, 20, and 30 on the corresponding position of each of the positioners 200. Here, the transfer unit 300 may be an automated guided vehicle (AGV) that is capable of automatically loading, transporting, and unloading the fuselage parts 10, 20, and 30 while transceiving with a control unit 420 by wireless. Also, when the fuselage parts 10, 20, and 30 are completely assembled with each other, the transfer unit 300 may automatically dismount the assembled fuselage 1 from the positioners 200 to transfer to a predetermined place and then unload the fuselage 1.

Here, first, a center fuselage 20 of the fuselage parts 10, 20, and 30 may be loaded on and transferred by the transfer unit 300 and put and mounted on the positioners 200. Then, front and after fuselages 10 and 20 may be loaded on and transferred by the transfer unit 300 and respectively put and mounted on the positioners 200. Here, the fuselage parts 10, 20, and 30 may have coupling parts that coincide with each other so that each of the fuselage parts 10, 20, and 30 is adjusted in position by the positioners 200 and thus be assembled with each other after the front, center, and after fuselages 10, 20, and 30 are mounted on the positioners 200 so that the front, center, and after fuselages 10, 20, and 30 are arranged in a line. Then, a worker may couple the fuselage parts 10, 20, and 30 to each other by using a separate coupling unit to fix the front, center, and after fuselages 10, 20, and 30 to each other. After the fuselage parts 10, 20, and 30 are completely assembled, the transfer unit 300 may load the assembled fuselage 1 thereon to transfer the fuselage 1 to a predetermined place and then unload the fuselage 1 on the predetermined place.

The apparatus for automatically mounting and dismounting the aircraft fuselage according to the present invention may automatically mount and dismount the fuselage parts and the completely assembled fuselage to reduce time for assembling the fuselage, thereby improving productivity of the fuselage, assembly quality and workability.

Hereinafter, various embodiments of the positioners and the transfer unit according to the present invention will be described.

The positioners 200 includes: forward fuselage positioners 210 on which a forward fuselage 10 of the plurality of fuselage parts 10, 20, and 30 is mounted, the forward fuselage positioners 210 being disposed in a triangular shape to support three spots of a lower portion of the forward fuselage 10 and being fixed to the ground; center fuselage positioners 220 on which a center fuselage 20 of the plurality of fuselage parts 10, 20, and 30 is mounted, the center fuselage positioners 220 being disposed in a rectangular shape to support four spots of a lower portion of the center fuselage 20 and being fixed to the ground; and after fuselage positioners 230 on which a after fuselage 30 of the plurality of fuselage parts 10, 20, and 30 is mounted, the after fuselage positioners 230 being disposed in the rectangular shape to support four spots of a lower portion of the after fuselage 30 and being fixed to the ground.

That is, the forward fuselage positioners 210 on which the forward fuselage 10 is mounted may be disposed and fixed to the ground in a triangular shape so that the forward fuselage positioners 210 are correspond to a shape of the forward fuselage 10 of which a front side has a small width to support the three spots of the lower side of the forward fuselage 10. Also, the center fuselage positioners 220 on which the center fuselage 20 is mounted and the after fuselage positioners 230 on which the after fuselage 30 is mounted may be respectively disposed and fixed to the ground in a rectangular shape to support the four spots of the lower sides of each of the center and after fuselages 20 and 30.

Here, each of the positioners disposed in the triangular or rectangular shape may be disposed so that positioners are respectively disposed on vertexes of the triangular or rectangular shape and spaced apart from each other. A space between the positioners may be defined as a passage (a region) through which the transfer unit 300 moves.

Figure 7:
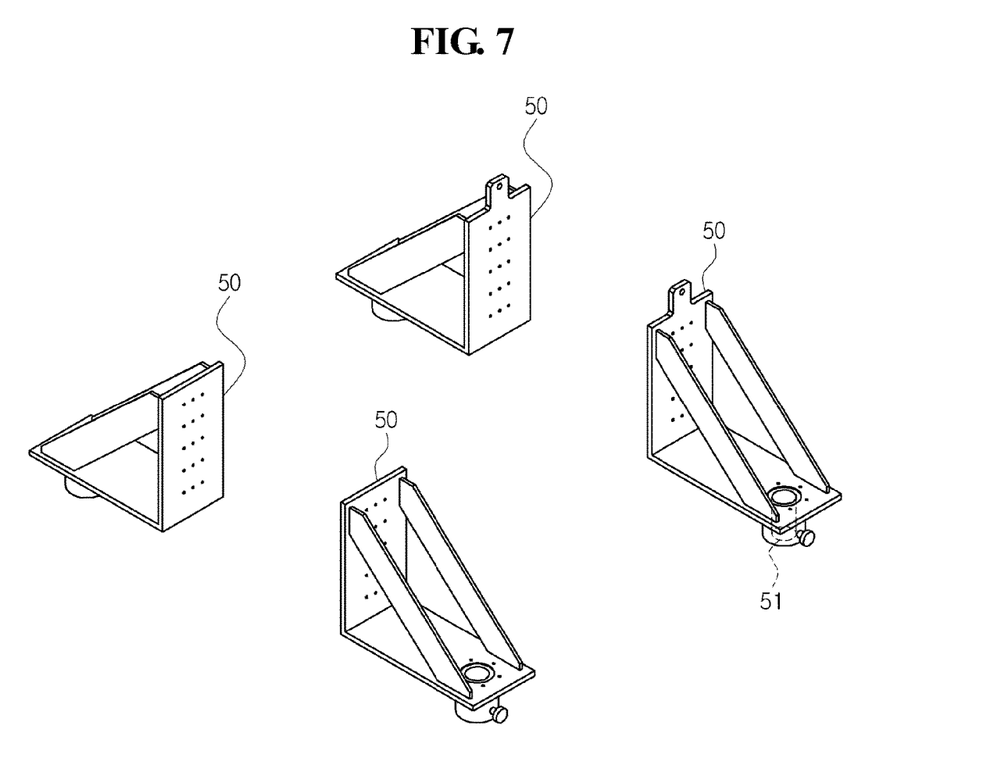
FIG. 7 is a perspective view illustrating a connector bracket, into which an adaptor of each of the positioners is inserted and coupled, coupled and fixed to a fuselage part according to an embodiment of the present invention.

Also, adaptors 250 each of which has a ball shape may be disposed on an upper end of each of the positioners 200. Also, a connector bracket 50 on which a seating unit 51 having a cup shape to allow the adaptor 250 having the ball shape to be inserted and coupled thereto is disposed may be coupled to each of the fuselage parts 10, 20, and 30.

Figure 6:
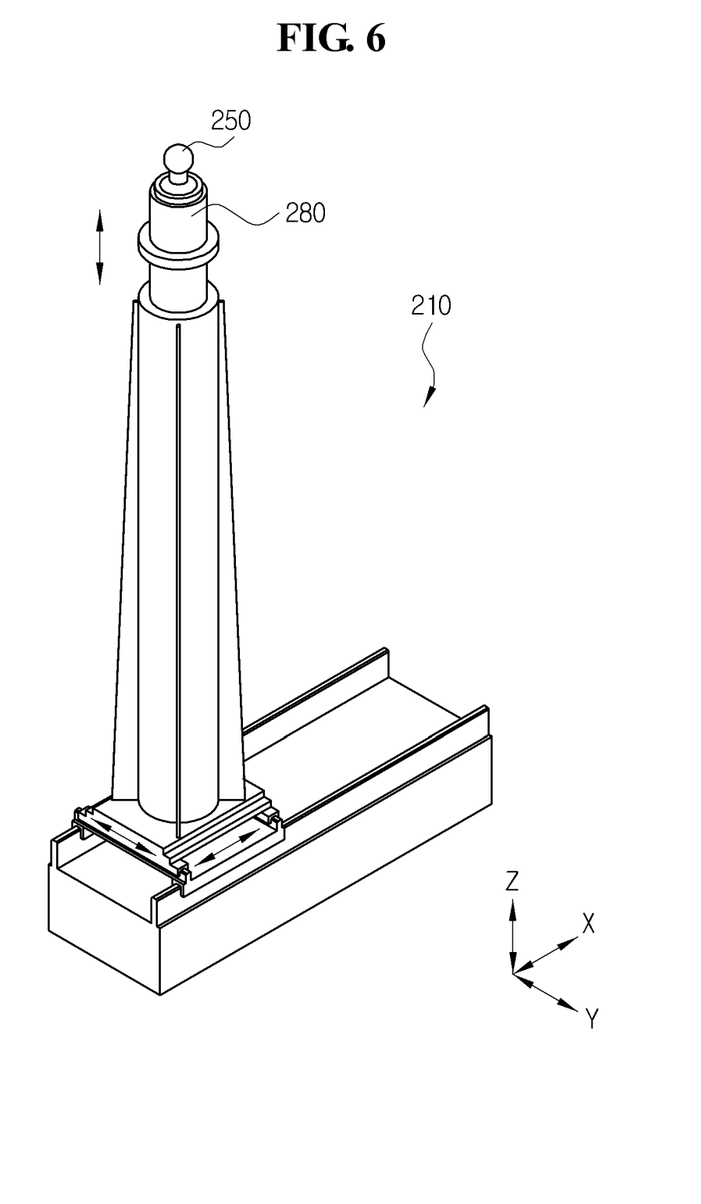

That is, as illustrated in FIGS. 4, 6, and 7, the connector bracket 50 may be coupled to each of the fuselage parts 10, 20, and 30, and the adaptor 250 disposed on the upper end of the positioner 200 may be inserted into the recessed seating unit 51 disposed on the connector bracket 50. Thus, each of the fuselage parts 10, 20, and 30 may be easily accurately mounted on the positioner 200.

Figure 5:
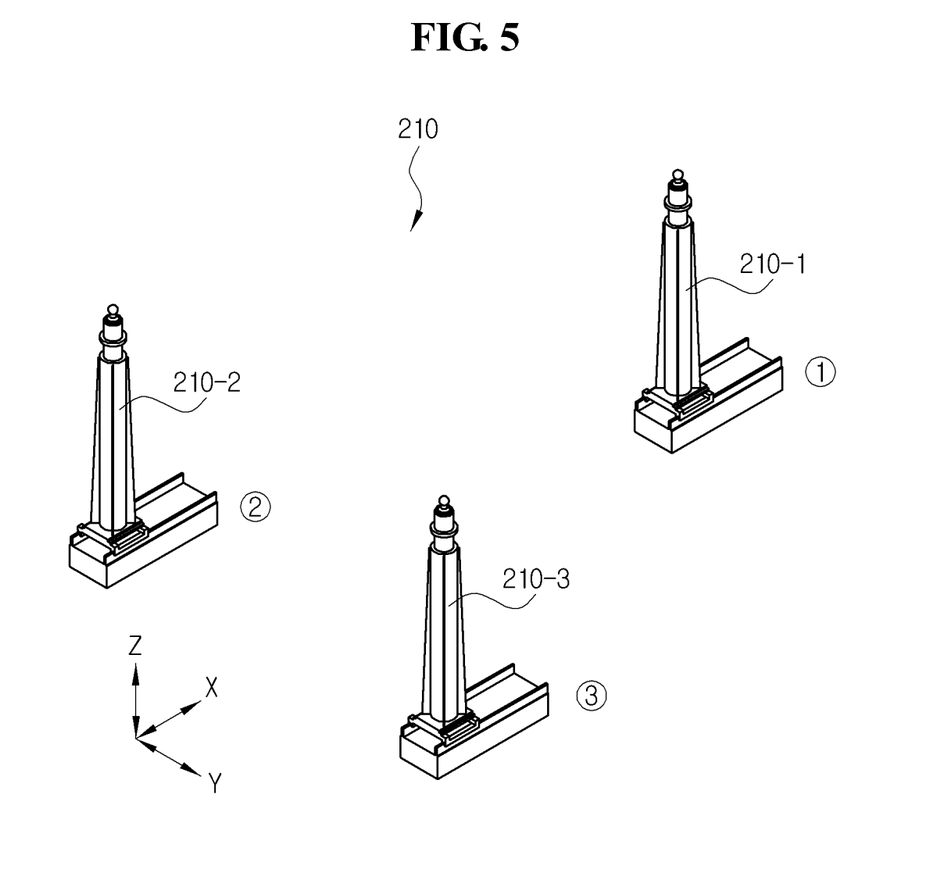
FIGS. 5 and 6 are perspective views of a forward fuselage positioner according to the present invention.

Also, the forward fuselage positioners 210 includes: a first-1 positioner 210-1 that is three-axially driven in the X, Y, and Z directions; a first-2 positioner 210-2 that is movable in the X direction, the first-2 positioner being two-axially driven in the Y and Z directions; and a first-3 positioner 210-3 that is movable in the X and Y directions, the first-3 positioner being one-axially driven in the Z direction.

That is, as illustrated in FIG. 5, three forward fuselage positioners 210 may be disposed on the vertexes of the triangular shape. Here, each of the first-1 positioner 210-1, first-2 positioner 210-2, and first-3 positioner 210-3 may be disposed to be driven in the Z direction so that the forward fuselage 10 is adjusted in height and is horizontally disposed. Also, each of the first-1 and first-2 positioners 210-1 and 210-2 may be driven in the Y direction to adjust a direction in which a horizontal central axis of the forward fuselage 10 towards and be adjusted in position in the Y direction so that the horizontal central axis of the forward fuselage 10 coincides with a central axis of the center fuselage 20 of which a position functions as a reference position. Also, the first-1 positioner 210-1 may be driven in the X direction to move the forward fuselage 10 in the X direction, thereby positioning a portion in which the forward fuselage 10 is coupled to the center fuselage 20 while the forward fuselage 10 contacts or is separated from the center fuselage 20 of which the position functions as the reference position. Here, the first-1 positioner 210-1 may be disposed on a frontmost central position, and the first-2 and first-3 positioners 210-2 and 210-3 may be disposed at a rear side of the first-1 positioner 210-1 and spaced apart from each other in the Y direction.

Figure 8:
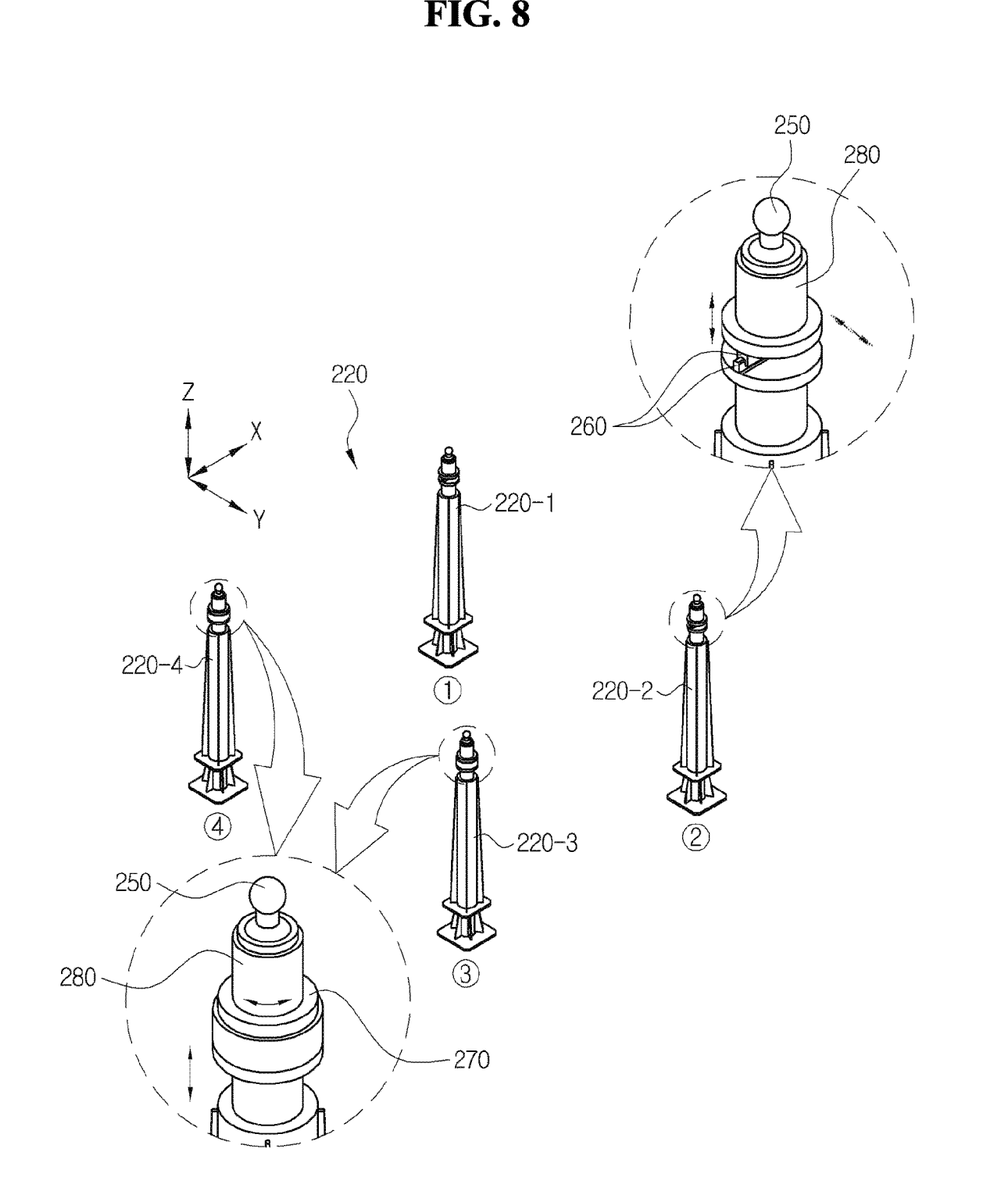
FIG. 8 is a perspective view of a center fuselage positioner according to the present invention.

Also, the center fuselage positioners 220 includes: a second-1 positioner 220-1 fixed in the X and Y directions, the second-1 positioner 220-1 being one-axially driven in the Z direction; a second-2 positioner 220-2 fixed in the X direction and movable in the Y direction, the second-2 positioner 220-2 being one-axially driven in the Z direction; and second-3 and second-4 positioners 220-3 and 220-4 each of is fixed in the X and Y directions, the second-3 and second-4 positioners 220-3 and 220-4 rotating about an axis in the Z direction and being one-axially driven in the Z direction.

That is, as illustrated in FIG. 8, four center fuselage positioners 220 may be disposed on the vertexes of the rectangular shape. Here, since the center fuselage 20 is defined as a reference position, the second-1 positioner 220-1 may be defined as a horizontal reference position (the X and Y directions) and thus be fixed in the X and Y directions. Here, the second-1, second-2, second-3, and second-4 positioners 220-1, 220-2, 220-3, and 220-4 may be driven in the Z direction to adjust the height of the center fuselage 20 and allow the center fuselage 20 to be horizontally disposed. Also, the second-2 positioner 220-2 may not move in the X direction but move in the Y direction. That is, the second-2 positioner 220-2 may have a degree of freedom in the Y direction. Also, the second-3 and second-4 positioners 220-3 and 220-4 may not move in the X and Y directions but rotate with respect to an axis of the Z direction. That is, the second-3 and second-4 positioners 220-3 and 220-4 may have a degree of freedom in the X and Y directions. Here, the second-2 positioner 220-2 may be disposed to be spaced apart from the second-1 positioner 220-1 in the Y direction. The second-3 positioner 220-3 may be disposed to be spaced apart from the second-2 positioner 220-2 in the X direction. Also, the second-4 positioner 220-4 may be disposed to be spaced apart from the second-1 positioner 220-1 in the X direction.

Here, the adaptor 250 having a ball shape may be disposed on an upper end of the second-2 positioner 220-2. Also, a linear motion (LM) bearing 260 may be disposed between the adaptor 250 and the upper end of the second-2 positioner 220-2.

That is, the adaptor 250 may be coupled to the upper end of the second-2 positioner 220-2 by the LM bearing 260 and move in the Y direction by the LM bearing 260. Thus, the second-2 positioner 220-2 may have a degree of freedom in the Y direction.

Also, the adaptor 250 having a ball shape may be disposed on each of upper ends of the second-3 and second-4 positioners 220-3 and 220-4. Here, a thrust bearing 270 may be disposed between the adaptor 250 and each of the upper ends of the second-3 and second-4 positioners 220-3 and 220-4.

That is, the adaptor 250 may be coupled to each of the upper ends of the second-3 and second-4 positioners 220-3 and 220-4 by the thrust bearing 270 and rotate with respect to the Z direction by the thrust bearing 270. Thus, each of the second-3 and second-4 positioners 220-3 and 220-4 may have a degree of freedom in the X and Y directions. Here, a center of the adaptor 250 and a rotational-central axis of the thrust bearing 270 may be eccentrically disposed, and thus the second-3 and second-4 positioners 220-3 and 220-4 may have the degree of freedom in the X and Y directions.

Figure 9:
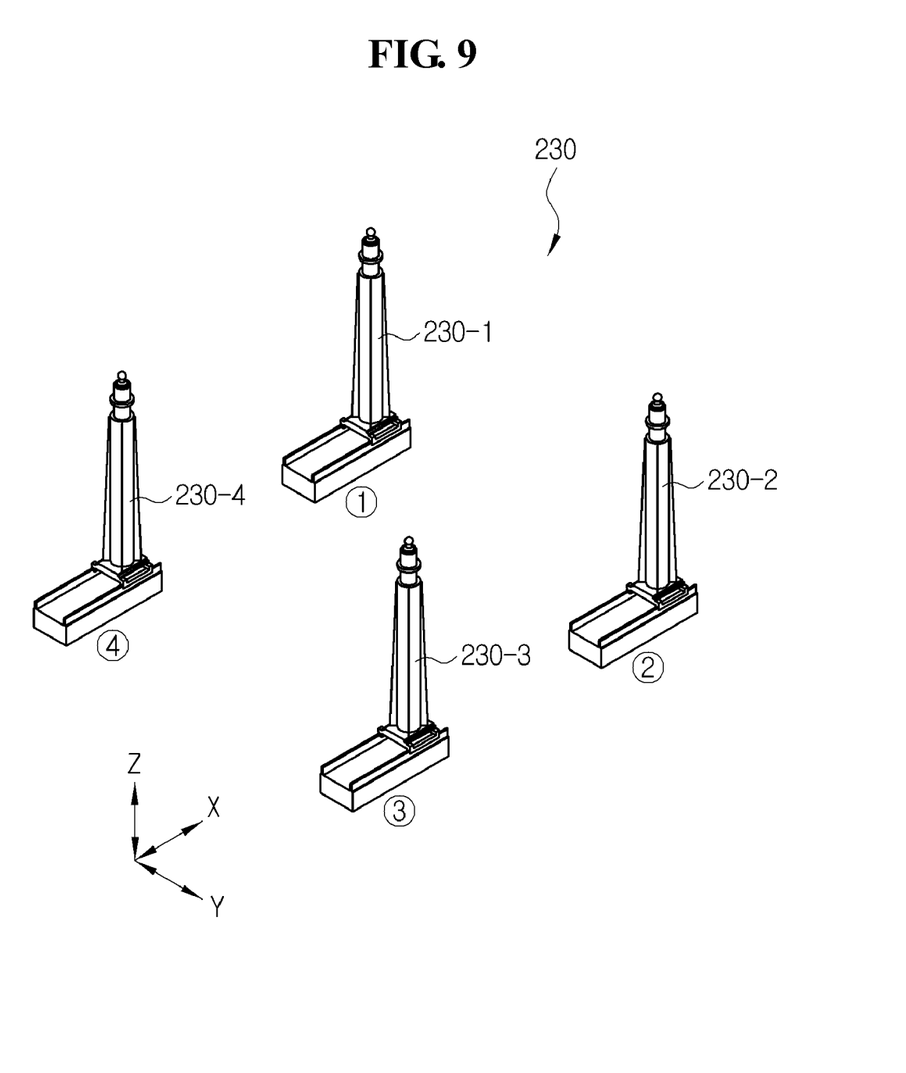
FIG. 9 is a perspective view of a after fuselage positioner according to the present invention.

Also, the after fuselage positioners 230 includes: a third-1 positioner 230-1 three-axially driven in the X, Y, and Z directions; a third-2 positioner 230-2 that is movable in the X direction, the third-2 positioner 230-2 being two-axially driven in the Y and Z directions; a third-3 positioner 230-3 that is movable in the X and Y directions, the third-3 positioner 230-3 being one-axially driven in the Z direction; and a third-4 positioner 230-4 that is movable in the X and Y directions, the third-4 positioner 230-4 being one-axially driven in the Z direction.

That is, as illustrated in FIG. 9, four after fuselage positioners 230 may be provided and disposed on the vertexes of the rectangular shape. Here, each of the third-1 positioner 230-1, third-2 positioner 230-2, third-3 positioner 230-3, and third-4 positioner 230-4 may be driven in the Z direction to adjust a height of the after fuselage 30 and to allow the after fuselage 30 to be horizontally disposed. Also, each of the third-1 and third-2 positioners 230-1 and 230-2 may be driven in the Y direction to adjust a direction in which a horizontal central axis of the after fuselage 30 towards and be adjusted in position in the Y direction so that the horizontal central axis of the after fuselage 30 corresponds to the central axis of the center fuselage 20 of which the position functions as the reference position. Also, the third-1 positioner 230-1 may be driven in the X direction to move the after fuselage 30 in the X direction, thereby positioning a portion in which the after fuselage 30 is coupled to the center fuselage 20 while the after fuselage 30 contacts or is separated from the center fuselage 20 of which the position functions as the reference position. Here, the third-2 positioner 230-2 may be disposed to be spaced apart from the third-1 positioner 230-1 in the Y direction. The third-3 positioner 230-3 may be disposed to be spaced apart from the third-2 positioner 230-2 in the X direction. Also, the fourth-4 positioner 230-4 may be disposed to be spaced apart from the third-1 positioner 230-1 in the X direction.

Here, the adaptor 250 may be disposed on each of upper ends of the positioners. A load cell 280 may be disposed between the adaptor 250 and the upper end of the positioner to measure a load supported by the positioner, thereby determining whether the positioner is normal. Also, the load cell 280 may be disposed between the adaptor 250 and the LM bearing 260. Also, the load cell 280 may be disposed between the adaptor 250 and the thrust bearing 270.

Figure 10:
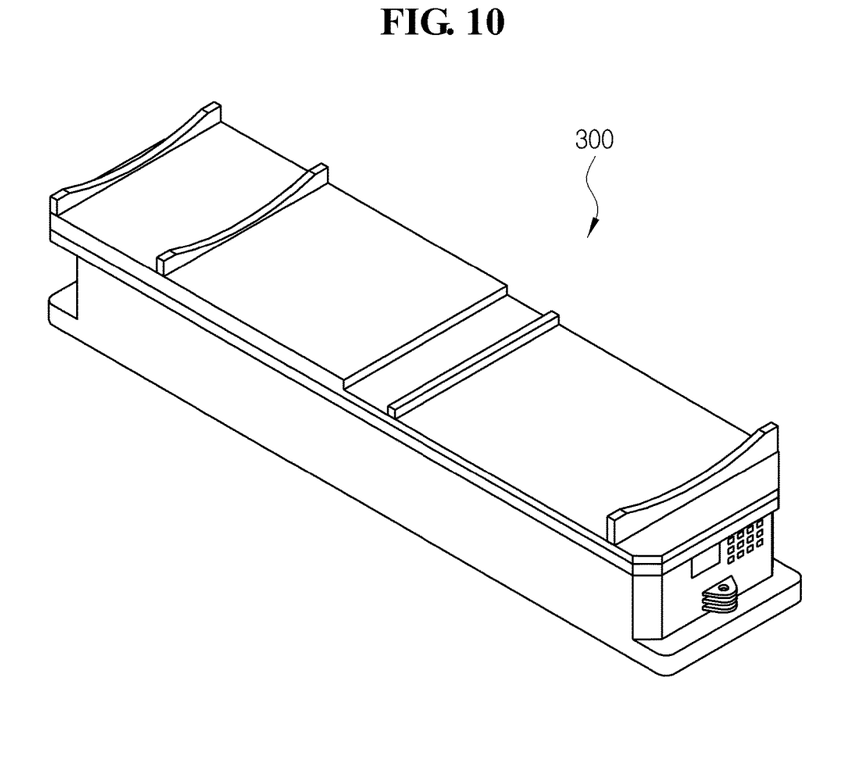
FIGS. 10 and 11 are perspective view and a right-side view of an automated guided vehicle (AGV) according to the present invention.
Figure 11:
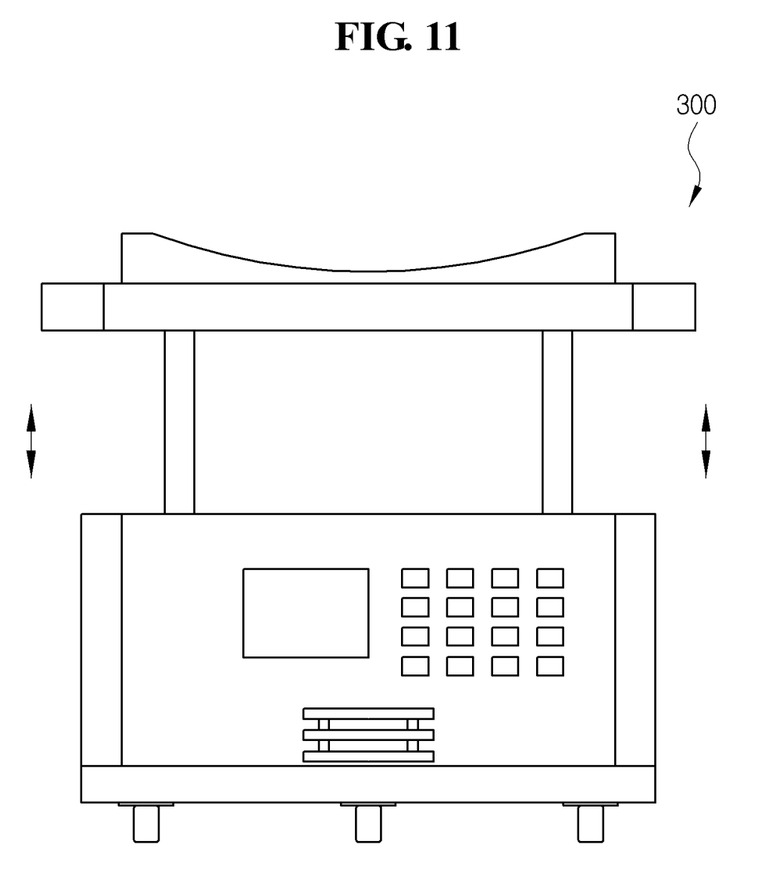

Also, the transfer unit 300 may be the AGV. At least two AGV may be provided.

That is, the transfer unit 300 for transferring the fuselage parts 10, 20, and 30 may be an AGV that is capable of automatically loading, transferring, and unloading the fuselage parts 10, 20, and 30. Here, the AGV may be provided in three, and each the AGV may be an AGV for transferring the forward fuselage 10, an AGV for transferring the center fuselage 20, and an AGV for transferring the after fuselage 30. Also, since the completely assembled fuselage 1 has a long length and a heavy weight, a separate AGV for the assembled fuselage may be provided, and thus four AGVs may be provided in total.

Also, the transfer unit 300 may adjust the vertical heights of the fuselage parts 10, 20, and 30 and the assembled fuselage 1.

That is, the transfer unit 300 may automatically put and load the fuselage parts 10, 20, and 30 thereon in a predetermined place and unload the fuselage parts 10, 20, and 30 on the positioners 200 to be mounted. As illustrated in FIGS. 10 and 11, the transfer unit 300 may be adjusted in vertical height so that the transfer unit 300 loads the assembled fuselage 1 thereon to move and unloads the assembled fuselage 1 therefrom in a predetermined place.

Also, the apparatus may further include a laser tracker 410 irradiating laser beams onto a plurality of points on each of the fuselage parts 10, 20, and 30 when the fuselage parts 10, 20, and 30 are mounted on the positioners 200 to detect the position of each of the fuselage parts 10, 20, and 30, thereby transmitting a detected position detection signal; and a control unit 420 receiving the position detection signal transmitted from the laser tracker 410 to calculate a difference between data with respect to the position detection signal and preset data, thereby generating and transmitting micro-driving data of the positioner 200 until a difference between the positions of the fuselage parts 10, 20, and 30 do not exist.

That is, as illustrated in FIG. 4, the laser tracker 410 may detect the position of each of the fuselage parts 10, 20, and 30 mounted on the positioners 200 to transmit the signal to the control unit 420. Also, the control unit 420 may transmit a micro-driving signal to the positioners 200 so that each of the fuselage parts 10, 20, and 30 moves to a position in which the fuselage parts 10, 20, and 30 are assembled with each other, and thus the fuselage parts 10, 230, and 30 may move to the position where they are precisely assembled with each other.

The apparatus for automatically mounting and dismounting the aircraft fuselage according to the present invention may automatically mount and dismount the fuselage to reduce assembly time, thereby improving productivity of the fuselage, assembly quality and workability.

While the present invention has been shown and described in connection with the exemplary embodiments, it will be apparent to those skilled in the art that modifications and variations can be made without departing from the spirit and scope of the invention as defined by the appended claims.

DESCRIPTION OF THE REFERENCE NUMERAL OF THE DRAWINGS

1000: Apparatus for automatically mounting and dismounting aircraft fuselage
1: Fuselage
10, 20, 30: Fuselage parts
(10: Forward fuselage,   20: Center fuselage,   30: After fuselage)
50: Connector bracket          51: Seating unit
100: Stage
200: Positioner
210: Forward fuselage positioner
210-1: First-1 positioner          210-2: Frist-2 positioner
210-3: First-3 positioner
220: Center fuselage positioner
220-1: Second-1 positioner         220-2: Second-2 positioner
220-3: Second-3 positioner         220-4: Second-4 positioner
230: After fuselage positioner
230-1: third-1 positioner          230-2: Third-2 positioner
230-3: Third-3 positioner          230-4: Third-4 positioner
250: Adaptor
260: LM bearing
270: Thrust bearing
280: Load cell
300: Automated guided vehicle(AGV)
410: Laser tracker
420: Control unit

What is claimed is:

1. An apparatus for automatically mounting and dismounting an aircraft fuselage, the apparatus comprising:

stages disposed to be spaced apart from each other;
positioners disposed between the stages and on which a plurality of fuselage parts is mounted, the positioners configured to adjust a position of each of the mounted fuselage parts in X, Y, and Z directions; and
a transfer unit configured to automatically load, transport, and unload the fuselage parts and assembled fuselage parts;
wherein the positioners comprising forward fuselage positioners on which a forward fuselage of the plurality of fuselage parts is configured to be mounted, the forward fuselage positioners being disposed in a triangular shape to support three spots of a lower portion of the forward fuselage and being fixed to the ground;
center fuselage positioners on which a center fuselage of the plurality of fuselage parts is configured to be mounted, the center fuselage positioners being disposed in a rectangular shape to support four spots of a lower portion of the center fuselage and being fixed to the ground;
after fuselage positioners on which an after fuselage of the plurality of fuselage parts is configured to be mounted, the after fuselage positioners being disposed in the rectangular shape to support four spots of a lower portion of the after fuselage and being fixed to the ground; and
wherein the forward fuselage positioners comprise a first-1 positioner that is three-axially driven in the X, Y, and Z directions and no other direction; a first-2 positioner that is movable in the X direction, the first-2 positioner being two-axially driven in the Y and Z directions and no other direction; and a first-3 positioner that is movable in the X and Y directions, the first-3 positioner being one-axially driven in the Z direction and no other direction.

2. The apparatus of claim 1, wherein an adaptor having a ball shape is disposed on an upper end of each of the positioners, and
a connector bracket having a seating unit with a cup shape, the seating unit configured to insert the adaptor having the ball shape into, and the adaptor configured to be coupled to, each of the fuselage parts.

3. The apparatus of claim 1, wherein the center fuselage positioners comprise:
a second-1 positioner fixed in the X and Y directions, the second-1 positioner configured to be one-axially driven in the Z direction;
a second-2 positioner fixed in the X direction and movable in the Y direction, the second-2 positioner configured to be one-axially driven in the Z direction; and
second-3 and second-4 positioners, each of which is fixed in the X and Y directions, the second-3 and second-4 positioners configured to rotate about an axis in the Z direction and be one-axially driven in the Z direction.

4. The apparatus of claim 3, wherein an adaptor having a ball shape is disposed on an upper end of the second-2 positioner, and
a linear motion (LM) bearing is disposed between the adaptor and the upper end.

5. The apparatus of claim 4, wherein the adaptor having the ball shape is disposed on an upper end of each of the second-3 and second-4 positioners, and
a thrust bearing is disposed between the adaptor and the upper end.

6. The apparatus of claim 1, wherein the after fuselage positioners comprise:
a third-1 positioner configured to be three-axially driven in the X, Y, and Z directions;
a third-2 positioner that is movable in the X direction, the third-2 positioner configured to be two-axially driven in the Y and Z directions;
a third-3 positioner that is movable in the X and Y directions, the third-3 positioner configured to be one-axially driven in the Z direction; and
a third-4 positioner that is movable in the X and Y directions, the third-4 positioner configured to be one-axially driven in the Z direction.

7. The apparatus of claim 1, wherein the transfer unit comprises an automated guided vehicle (AGV), and
the AGV is provided in two or more.

8. The apparatus of claim 1, wherein the transfer unit is configured to adjust in vertical height so that each of the fuselage parts and assembled fuselage is adjusted in vertical height.

9. The apparatus of claim 1, further comprising:
a laser tracker configured to irradiate laser beams onto a plurality of points on each of the fuselage parts when the fuselage parts are mounted on the positioners to detect the position of each of the fuselage parts, and configured to thereby transmit a detected position detection signal; and
a control unit configured to receive the position detection signal transmitted from the laser tracker to calculate a difference between data with respect to the position detection signal and preset data, and configured to thereby generate and transmit micro-driving data of the positioner until a difference between the positions of the fuselage parts do not exist.

* * * * *